United States Patent [19]

Rausing

[11] Patent Number: 4,828,636

[45] Date of Patent: May 9, 1989

[54] METHOD FOR PRODUCING MULTI-PAGE DOCUMENTS FROM A MATERIAL WEB

[75] Inventor: Hans Rausing, Wadhurst, England

[73] Assignee: Svecia Antiqua S.A., Fribourg, Switzerland

[21] Appl. No.: 89,156

[22] Filed: Aug. 25, 1987

[30] Foreign Application Priority Data

Aug. 29, 1986 [GB] United Kingdom ................. 8620997

[51] Int. Cl.[4] ............................................. B32B 31/08

[52] U.S. Cl. .................................... 156/204; 156/227; 156/277; 156/474; 283/106; 412/8; 412/37; 412/900; 428/137; 428/181; 428/916

[58] Field of Search ............... 156/204, 227, 277, 474; 282/12 A; 283/106; 412/8, 37, 900; 428/181, 916, 137

[56] References Cited

U.S. PATENT DOCUMENTS 2,874,754 2/1959 Yost et al. ....................... 156/204 X

FOREIGN PATENT DOCUMENTS 1594604 8/1981 United Kingdom .

*Primary Examiner*—Robert A. Dawson

*Attorney, Agent, or Firm*—Burns, Doane, Swecker & Mathis

[57] ABSTRACT

A method for the production of books or bound documents from a material web (4) which comprises folding lines (6,7) or perforation lines arranged at a distance from one another and whose one side possesses a thin coating of an adhesive capable of being activated, includes printing the web (4) with the desired text and subsequently folding the web together in a folding pattern. After folding together of the web (4) the adhesive is activated so that layers with adhesive facing one another are joined together to form book-pages which can be bound together in a cover (15).

19 Claims, 1 Drawing Sheet

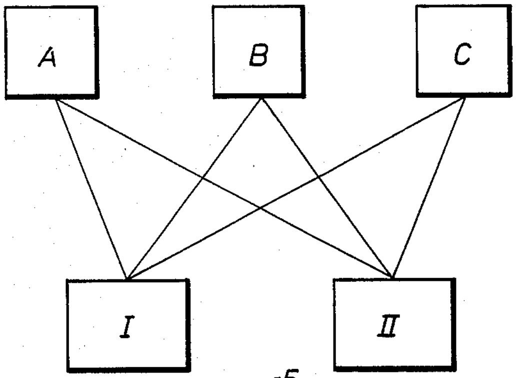
Fig. 1
Fig. 2a
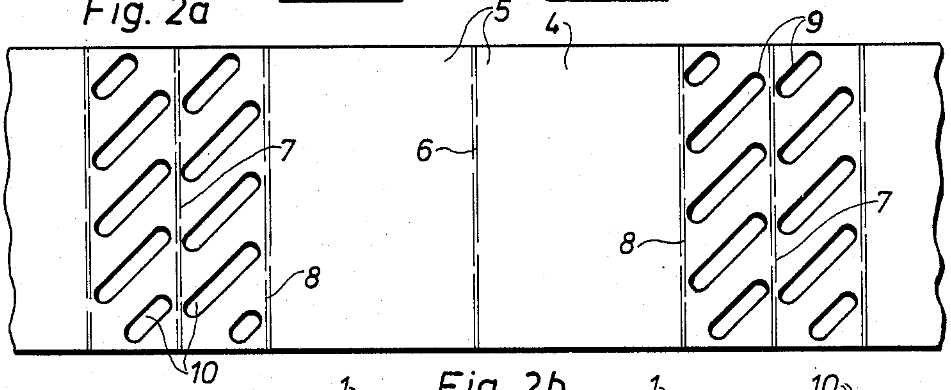
Fig. 2b
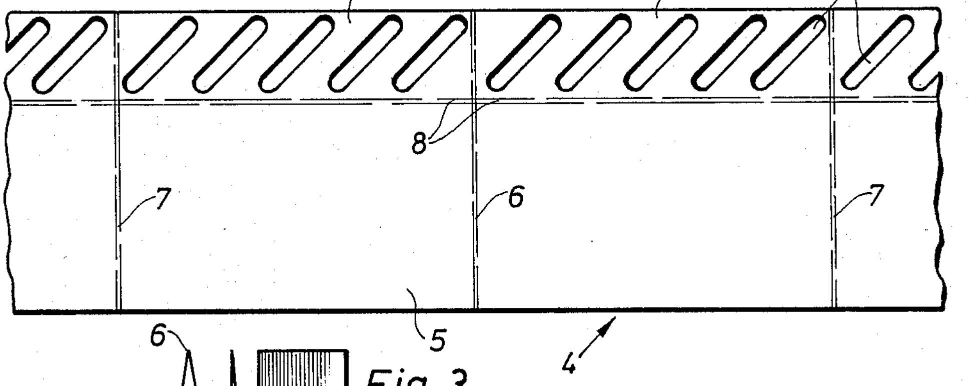
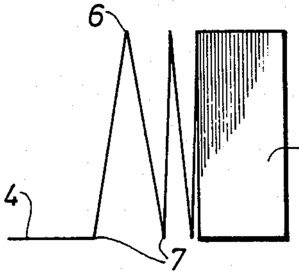
Fig. 3
Fig. 4
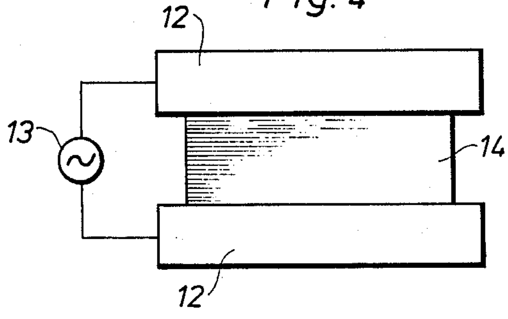
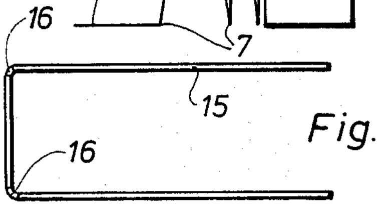
Fig. 5

METHOD FOR PRODUCING MULTI-PAGE DOCUMENTS FROM A MATERIAL WEB

FIELD OF THE INVENTION

The present invention relates to a method for the production of books or bound documents with the help of a material web, and a book or document which comprises a number of mutually connected leaves.

BACKGROUND OF THE INVENTION

The production of bound papers or doucuments such as e.g. passports, membership books, identification documents etc, frequently occurs in such a manner that the actual document is manufactured in one operation by application of known techniques whilst the filling in of the relevant data on the document constitutes a separate operation. This procedure involves appreciable risks of falsification of the documents in question, on the one hand on the grounds of the finished but not filled-in documents possibly getting into the wrong hands and being filled in or completed with false information and, on the other hand, on the grounds of legitimate, subsequently filled in documents being relatively easy to falsify in that information already filled in is altered or supplemented.

In order to prevent such risk of falsification, identification documents and driving licences, among others, are manufactured at the same time as factual information including any photographs are entered into the document whereupon the whole document is coated with plastic layers so as to make it falsification-proof and at the same time mechanically durable. The manufacture of the falsification-protected documents, in principle, takes place so that all of the relevant data including the photograph, signature etc. of the owner are set up on a document, which is then photographed. The photographic copy is coated with plastic material and becomes the original document whilst the original of the photographed document is destroyed or filed in the archive. The procedure is not practical, however, when it is to be used for documents which are more extensive and comprise a number of pages such as e.g. passport documents, membership books and other similar documents.

A rational and falsification-protected method of manufacturing documents of the type referred to here consists in using modern data technique, whereby the actual document is produced, at the same time as the data required for the document as well as the data or codes for the proof of legitimacy of the document are entered.

All the information relevant for the actual document can exist stored in a data bank where at the issue of the document the data are written down or printed onto a running web which later is converted to a bound document.

OBJECTS AND SUMMARY OF THE INVENTION

The present invention provides a method for the production of documents of the type mentioned here by using a material web which comprises folding lines transversing the web and arranged at a distance from one another and which has on its one side a thin coating of an adhesive capable of being activated, preferably heat-activated, the method being characterized by (a) printing of the desired text onto the side of the material web which does not possess adhesive coating, (b) folding together of the web in a folding pattern in such a manner that each of the web portions or sheets situated between two successive folding lines forms a book-page, and (c) joining together of coatings of adhesive facing one another through activation of the adhesive with simultaneous compression of the folded-up web.

BRIEF DESCRIPTION OF THE DRAWING

A preferred embodiment of the invention will be described in the following with reference to the attached schematic drawing, wherein, FIG. 1 is a schematic diagram illustrating how a number of data banks containing information relevant for the books or documents can be coupled together with a centrally arranged printer for the writing out or printing of the book or document.

FIGS. 2*a* and 2*b* are plan views of variants of a running web intended for printing.

FIGS. 3 is a schematic view illustrating how the web in accordance with FIG. 2 is folded so as to form a stack, FIG. 4 is a further schematic view illustrating how the folded stack of sheets is compressed and adjoining sheets with adhesive layers are bonded to one another, and FIG. 5 is a side view of a cover intended to enclose the sealed book pack or the document.

DETAILED DESCRIPTION OF A PREFERRED EMBODIMENT

The production process of e.g. a passport document may take place in such a manner, in accordance with the invention, that a person applying for a passport calls on an authority issuing passport documents, which is indicated in FIG. 1 by I or II. After proper identification of the applicant for a passport the authority, with the help of a specially arranged program which controls the authority's data installation, can rapidly acquire via the data bank center A, B and C the relevant data required for the passport document which are assembled and written out, with the help of a data program established for the production of passports, onto a running web 4 of paper which on its inside is provided with an adhesive coating capable of being activated. After the writing out of all the sheets 5 necessary for the document, they are folded together along prepared folding lines 6,7 and introduced into an arrangement where the folded stack 11 of paper is compressed at the same time as the adhesive layer on the web 4 is activated so that adhesive layers arranged next to one another are bonded together. As will be described later, text, figures, photographs etc. may be inserted between the combined sheets 5 which constitute the proof of legitimacy for the document and check of identity for the holder of the document. When the sheets 5 have been attached to each other in the abovementioned manner, the document may be bound between outer covers 15.

Beside being used for documents like passports, membership books etc. the method in accordance with the invention may also be applied to the production of other types of books. This production may take place in such a manner that a customer who desires a certain book calls on a book retailing shop I or II in accordance with FIG. 1. The book retailing shop does not have in the customary manner a large stock of books, but is provided instead with one or more highspeed printers, e.g. ink jet printers or laser printers, and is provided moreover with a data installation which is terminal-connected to several publishing houses or data bank centres A, B or C. The customer can select in a catalogue the book he desires, whereupon the data operator by means of his terminal I establishes a connection to the data bank of the publishing house which publishes the desired book. When contact has been established via the telecommunication network, e.g. between the bookseller I and the publishing house B, data relating to the desired book are acquired.

In both the cases reported here the printer at the authority or organization which issues the document or the retailing shop which presents the book is controlled by information which is obtained from one or more data banks and the printer writes out the information transmitted onto the web 4 shown in FIG. 2. As mentioned above it is possible to perform this writing at very high speed (more than 100 sheet sides/minute), which means that a normal book or document can be "printed" or written out in a very short time. The writing need not be done line by line, but the web 4 can be advanced in the direction of the lines and not at right angles to the lines as happens in a normal script on a typewriter. To obtain sufficient speed in the writing a number of writing devices can be adapted to co-operate, each performing the writing work along a narrow sector or longitudinal portion of the paper web. In spite of the writing being performed by a number of writing devices operating individually and, moreover, writing the pages in the direction of the lines (i.e. all the lines are writen simultaneously), the text will be very distinct and uniform and fully comparable with printed text. The web 4 also may be written in "conventional manner", that is to say the web 4 is advanced in a direction at right angles to the extension of the lines and the text is written out line by line. This too can be done with a number of writing devices or writing nozzles if an ink jet printer is used, except that so as to allow the web to be folded to a book in the manner as shown in FIG. 3, every other side has to be turned by 180°.

When all the sides of the book have been written, the web 4 is folded in the manner as shown in FIG. 3, the folding taking place along the first folding lines 6,7 provided beforehand on the web as shown in FIG. 2 so as to form a stack 11 of folded-up sheets 5.

As is evident from FIG. 2*a* the web 4 is provided not only with the folding lines 6 and 7, but also with second folding lines 8 which are arranged relatively near the folding lines 7. In the area between the first folding lines 7 and the second folding lines 8 the through holes 9,10 are provided in the paper web, the holes not being located in the same place on the panels which are formed between the folding lines 8 and 7, but the holes 9 and 10 respectively being displaced in relation to each other so that on folding of the web the holes 9,10 in adjacent sheets 5 will not overlap each other. It can be advantageous in certain cases to arrange the holes 10 as shown in FIG. 2*a* sloping towards the longitudinal direction of the sheet, so that a greater width of the panel delimited by the folding lines 7 and 8 is covered by the holes 10. The web 4 may also be arranged in the manner as shown in FIG. 2*b*, that is to say the web 4 is provided with likewise previously imprinted folding lines 6,7 at right angles to the extension of the web, and the web is folded along these folding lines in the manner as shown in FIG. 3. In this case, however, the web has folding lines 8′ arranged in the longitudinal direction of the web, an area 1 being formed on each sheet between the edge of the web 4 and the folding lines 8. In this area 1 through holes or cutouts 10 are provided which are arranged so that holes 10 in adjacent sheets 5 will not cover one another when the web is folded along the folding lines 6 and 7.

As mentioned earlier, the web 4 is provided on its one side, that is to say the side which does not carry text, with a thin layer of an adhesive capable of being activated. This adhesive can be activated appropriately by heat which can be supplied by means of normal radiant or conduction heat, but the adhesive layer may also be adapted so that it is heated with the help of a high-frequency electromagnetic field. In the folding of the web 4 the adhesive layers on the non-printed side of the web will be brought together, and the stack of folded sheets 5 shown in FIG. 3 may be placed into an arrangement in accordace with FIG. 4 consisting of two pressure plates 12 between which the stack 14 of sheets is compressed at high pressure at the same time as the plates are connected to a high-frequency generator 13 so that an electric field is generated between the plates 12. If the adhesive has a high dielectric constant, the adhesive layers on the web 4 will be heated uniformly to such a degree that the adhesive layers pressed against each other fuse together, whereby the sheets 5 placed against one another on folding are joined to one another.

As mentioned previously, it is also conceivable for the adhesive layers on the web to be heated with the help of radiant heat or hot air, but since the folding process then becomes troublesome to perform, this method would not be appropriate for the manufacture of thicker books. On joining together in accordance with FIG. 4 the printed or written pages of the sheets 5 will not stick to one another, since these pages are not coated with adhesive layers. The panels between the folding lines 8 and 7, and between and 8 and the web edge, will stick to one another, since the adhesive layer of one of the panels will be exposed in the holes 9,10 of the adjoining panel, which means that the panels will adhere to one another. This successive bonding between panels implies that the stack 14 of sheets 5, along its one side, is given a firmly bonded ridge-like part wherein all layers in the stack 14, whether or not they have a coating of adhesive, will be joined together through the adhesive bond which is formed through the holes 9 and 10 respectively.

Finally the sealed book or document can be provided with an outer cover 15 which has an internal heat-sealable adhesive layer to be attached to the sides of the stack 14. Moreover, the width of the cover 15 can be adjusted owing to the corners of the cover being provided with a number of folding lines 16 which are parallel to one another. The ultimate binding together between cover and book may be done e.g. in that a rivet joint is provided through the cover and through the part of the stack 14 where all the sheets 5 are joined together with the help of the holes 9,10. If the web has been arranged in accordance with FIG. 2*b*, that is to say the text is printed at right angles to the longitudinal direction of the web with every other page turned by 180°, the sealed-up book has to be edge-trimmed, since otherwise the pages will hang together along the top and bottom edges It is also possible to arrange the binding in such a manner that prefabricated covers of a number of different "thicknesses" or back widths are kept in stock which are used depending on the number of pages of the books which are to be produced. The insides of the covers are provided with an adhesive capable of heat activation, e.g. a polythene layer or a layer of some other thermoplastic material, and the coherent sheets in the "printed book" can be adapted so that the first and last sheets have an adhesive-coated surface along the outer sides of the stack of sheets facing towards the insides of the cover.

To obtain a "bound book" the whole of the stack of sheets and the covers are heated so that layers of adhesive facing towards each other are made to become attached to one another in a strong and durable sealing joint. It is important that the depth of the cover should be slightly greater than the thickness of the book so that the back of the cover bulges out a little from the stack of printed sheets. Alternatively, it is possible to allow the back to lie against, and be "fused together" with, the rear edges of the sheets in order to obtain a firmer binding. Under all circumstances the sides of the cover must be more rigid than its back.

For an easy reading of the book's title or designation the front cover may be provided with a punched out or transparent portion which during the binding is located exactly opposite the portion on the first side of the book where the title or designation is printed.

Especially in the production of identification documents of the passport type, it has been found advantageous to operate with a running web in the manner as described above and the reason for this is that possibilities exist here of inserting a proof of legitmacy within the leaves of the document joined together from sheets 5 which is very difficult to falsify and, moreover, almost completely impossible to alter or to tamper with.

In the following examples measures will be given which may be adopted for creating a proof of legitimacy of the documents in question which is difficult to falsify. The simplest step that can be taken consists in printing on the inside of the running web 4 check marks, figure or letter combinations, bar codes or the like. These markings, in principle, can be different for each sheet or groups of sheets 5 of, the web 4 and they can be placed in a certain defined code combination with each other. This implies that the said markings which have been affixed on or against the inside of the web 4 are visually readable or recordable in some manner from outside the web after the same has been folded to leaves. This is easily achievable by ensuring that the paper material in the web 4 is translucent so that the markings can be observed and read if the leaves in the actual document are held against a light source or against a luminous surface. The markings which may be affixed on or against the inside of the web 4 may be constituted, as has been mentioned, of printed combinations of numerals and letters and bar codes, but also of pictures, and it is also possible, instead of printing, to carry out local thickness reduction of the inside of the web 4 through grinding or milling which may be done either before or after the adhesive layer has been applied. On examination against the light the thickness reductions will be identified as lighter portions, since the light transmission is greater within the portions. Such a thickness reduction by grinding may be carried out so that the machined portions form letter or numeral combinations or other optional figures.

Another possibility consists in laminating in layers of e.g. polarized film between the sheets 5 so that the said film is included between adhesive layers of the sheets 5. Such a polarized film can readily be identified with the help of another polarized film which is used as a checking source. The document, in other words, can be twisted in front of a separate polarized film and, when the document is illuminated by means of a light, it can be observed how the radiation of light through the leaves is extinguished within the portions where a polarized film is laminated in, when the axes of polarization of the two polarized layers are twisted by 90° in relation to one another. If the light scatter in the paper layers which surround the polarized layer is too great, it may be necessary to provide in one of the sheets 5, which enters into the document as a leaf, windows or cutouts which expose parts of the laminated polaroid layer. These cutouts or windows may also be executed in the form of numeral or letter combinations, should this be desired.

Documents of the types of passports or the like nearly always contain a photograph of the holder and if the photograph is inserted directly into the passport document, it may be possible to exchange the same, even if the photograph has been affixed with the help of rivets or has been provided with an embossing or a seal. In the production of a passport document in accordance with the invention, it is possible to insert photographs in that in anyone of the sheets 5 which form leaves in the passport document a hole or an opening is punched out which is smaller than the photograph which is to be inserted, but which is large enough to expose substantial parts of the photograph. A photograph applied in the manner specified thus will be partly laminated in between two sheets 5 put together and sealed together to form jointly a leaf in the passport document which means that it is very difficult to remove or to exchange the photo without causing such damage on the document that the interference can be easily discovered. If it is desired to improve the security still further, the photo may be provided with a seal in a known manner.

It is also possible to insert between the leaves magnetically readable markings or radioactive markings. This may be done by means of printing, and it should be emphasized that detectors of radioactive radiation exist at present which are so sensitive that the radioactive markings which need to be introduced into the document have an extremely low level of radiation which is classified as completely safe. It is also possible to provide the document in a known manner with fluorescent markings which in themselves are invisible, but which appear on illumination with light of a certain wavelength, e.g. ultraviolet light. Such markings can be imprinted by means of conventional printing methods.

To obtain maximum proof of identity and security against falsification all the methods mentioned here can be combined and by collecting the data into the passport document from one or more secret-protected data banks, since the data which are collected do not pass any "intermediaries", it is possible to ensure that the data are correct and not manipulated in any way.

The most important advantage from a point of view of security for a document produced in accordance with the invention is that the leaves of the document are made from coherent sheets which are put together and laminated with the help of a coating of an adhesive applied to the insides of the sheets and that it is possible thereby to insert between the sheets which form a leaf proofs of legitimacy in the form of codes of optional type put on the sheet or on separate films and also to insert data concerning passport number, details of birth, name etc. which also appear as printed information on the outsides of the leaves, but which can be checked as to their not having been altered or manipulated by holding the passport leaf up against a light source, whereby the printed data entered into the passport can be checked against the same data, which normally are hidden within the leaves of the passport, but which can be observed if the leaves of the passport are held against a light source. After the individual sheets of the running web have been laminated together it is practically impossible to divide the sheets without destroying the sheets, so that there is almost perfect security against the data which are "laminated" into the individual leaves of the document having been altered in any way, and through inserted codes it is moreover possible, as mentioned previously, to check the legitimacy of the document by establishing that groups of different codes are in a certain code connection with one another.

While this invention has been illustrated and described in accordance with a preferred embodiment, it is recognized that variations and changes may be made and equivalents employed herein without departing from the invention as set forth in the claims.

I claim:

1. A method for printing and binding documents comprising the steps of:

printing text onto a first side of a material web having folding lines extending in a direction transverse to the longitudinal direction of the web to form sheets between said folding lines, said web having a coating of an adhesive material on a second side of the web;

folding the web at each of the folding lines to form a fan-fold stack of web portions with the adhesive coated second sides of the web being superimposed on each other; and activating the adhesive material to cause the second side of the web in each web portion to join the adjacent sheets in the stack.

2. A method in accordance with claim 1, wherein the activation of the adhesive material is carried out by heating the adhesive material.

3. A method in accordance with claim 1, further comprising the step of covering the stack with a cover whose inside surfaces are joined to the exposed web portions at the top and bottom of the stack.

4. A method in accordance with claim 1, wherein the adhesive has a dielectric coefficient exceeding 2 and the activation of the adhesive is performed by the application of a high-frequency electric field at substantially right angles to the folded-up and compressed web, which generates thermal energy in the adhesive layer.

5. A method in accordance with claim 1, wherein the printing is carried out by a data-controlled printer.

6. A method in accordance with claim 5, wherein the text is printed on the web by one or more writing devices arranged movably to traverse the web which are adapted to place marks or markings onto the web advanced synchronously with the movement of the writing devices to form a text whose text lines are parallel with the direction of advance of the web.

7. A material web for use in the production of bound documents comprising:

two web surfaces;

first folding lines extending in a direction transverse to the longitudinal direction of the web and spaced from each other in the longitudinal direction of the web;

a coating of adhesive material on one of said web surfaces; and web portions being defined between the first folding lines, each of the web portions having holes that perforate the web, the holes in adjoining web portions being positioned in relation to one another so that the holes do not completely overlap one another when the web is folded in a fan-fold manner.

8. A material web in accordance with claim 7, wherein the web is made of a translucent material and said one web surface possesses markings these markings being adapted, after the combining of the web to leaves through folding of the web, to be located within the leaves and inaccessible directly physically, but visually accessible and recordable from outside the web.

9. A material web in accordance with claim 7, wherein each of the web portions possesses a second folding line extending in a direction transverse to the web and located adjacent the holes so that the holes are situated between a first and a second folding line.

10. A material web in accordance with claim 7, wherein each of the web portions possesses a second folding line extending in the longitudinal direction of the web the holes being located between the second folding line and a lateral edge of the web.

11. A bound document comprising:

a plurality of leaves each including two sheets of a web, said web having an adhesive layer on one side for joining the two sheets together, said two sheets being superimposed and joined together by said adhesive layer, the outermost sheets of the document being joined with the insides of a cover, the web being formed of a translucent material.

12. A bound document in accordance with claim 11, wherein one or more of the leaves possesses marks located between the joined sheets which are preferably visually identifiable after binding of the document.

13. A document in accordance with claim 11, wherein identifiable markings are included in the joined sheets.

14. A document in accordance with claim 11, wherein each of the leaves of the document is the bearer of an individualizing mark which is unique for the book in question.

15. A document in accordance with claim 13, wherein the markings are magnetic markings.

16. A document in accordance with claim 13, wherein the markings are made with a radioactive material.

17. A document in accordance with claim 13, wherein the markings are made of a material which is luminescent in certain light.

18. A material web in accordance with claim 7, wherein web portions are defined between the folding lines and at least one web portion has a window or cut-out which is covered by a thin layer of polarized material, the said window or cut-out being in the form of a combination of numerals or letters or of a figure, and the polarized material, provided at least locally over the cut-outs, adapted to be taken up between two web portions which are folded together during production of the bound document to form a leaf of the document.

19. A material web in accordance with claim 7, wherein said holes are elongated holes that are elongated in a direction transverse to said first fold lines.

* * * * *